(12) United States Patent
Koegler et al.

(10) Patent No.: US 7,021,767 B2
(45) Date of Patent: Apr. 4, 2006

(54) INTEGRAL REFLECTOR AND HEAT SINK

(75) Inventors: John M. Koegler, Corvallis, OR (US); P. Guy Howard, Junction City, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 49 days.

(21) Appl. No.: 10/769,355

(22) Filed: Jan. 30, 2004

(65) Prior Publication Data

US 2005/0168702 A1    Aug. 4, 2005

(51) Int. Cl.
*G03B 21/16* (2006.01)
*G03B 21/18* (2006.01)
*G03B 21/26* (2006.01)
*G03B 27/52* (2006.01)
*F21V 29/00* (2006.01)

(52) U.S. Cl. .................. 353/52; 353/55; 353/57; 353/60; 353/85; 353/119; 362/294; 252/146; 355/30

(58) Field of Classification Search ............ 353/52, 353/55, 57, 60, 85, 119; 362/293, 294; 429/112; 352/143, 146; 355/30
See application file for complete search history.

(56) References Cited

U.S. PATENT DOCUMENTS

| | | | | |
|---|---|---|---|---|
| 4,156,057 | A * | 5/1979 | Zellhoefer | 429/112 |
| 5,329,436 | A * | 7/1994 | Chiu | 362/294 |
| 5,758,955 | A * | 6/1998 | Belliveau | 362/293 |
| 5,947,590 | A * | 9/1999 | Meuse et al. | 362/264 |
| 6,082,864 | A | 7/2000 | Rodriguez, Jr. et al. | 353/87 |
| 6,345,896 | B1 * | 2/2002 | Kurosawa | 353/119 |
| 6,398,367 | B1 | 6/2002 | Watanabe | 353/98 |
| 6,428,198 | B1 * | 8/2002 | Saccomanno et al. | 362/559 |
| 6,454,418 | B1 | 9/2002 | Lee et al. | 353/87 |
| 6,467,911 | B1 | 10/2002 | Ueyama et al. | 353/87 |
| 6,676,280 | B1 * | 1/2004 | Takatsuka et al. | 362/372 |
| 6,899,444 | B1 * | 5/2005 | Biber et al. | 362/345 |
| 2002/0005695 | A1 * | 1/2002 | Ichibakase et al. | 313/634 |
| 2002/0191159 | A1 * | 12/2002 | Nagao et al. | 353/54 |
| 2004/0081395 | A1 * | 4/2004 | Gawalkiewicz et al. | 385/31 |
| 2004/0264192 | A1 * | 12/2004 | Nagata et al. | 362/267 |
| 2005/0168991 | A1 * | 8/2005 | Koegler et al. | 362/296 |
| 2005/0168993 | A1 * | 8/2005 | Koegler et al. | 362/297 |

\* cited by examiner

*Primary Examiner*—Melissa Jan Koval

(57) ABSTRACT

An integral reflector and heat sink for use in a projector assembly includes a reflector portion comprising an integrated heat sink; and a lamp receiving opening defined in the reflector portion.

25 Claims, 11 Drawing Sheets

INTEGRAL REFLECTOR AND HEAT SINK

BACKGROUND

Digital projectors, such as digital mirror devices (DMD) and liquid crystal display (LCD) projectors, project high quality images onto a viewing surface. Both DMD and LCD projectors utilize high intensity lamps and reflectors to generate the light needed for projection. Light generated by the lamp is concentrated as a 'fireball' that is located at a focal point of a reflector. Light produced by the fireball is directed into a projection assembly that produces images and utilizes the generated light to form the image. The image is then projected onto a viewing surface. Misalignment of the focal point causes degradation of the image since less light is captured and creates 'hot spots' on the screen instead of a uniform brightness.

Efforts have been directed at making projectors more compact while making the image of higher and higher quality. As a result, the lamps utilized have become more compact and of higher intensity. Higher intensity lamps produce high, even extreme heat. The outer surface of the lamps can approach temperatures of 900° C. As a result, projector designs must account for the intense heat. In addition, losses due to misalignment of the fireball with respect to the reflector are amplified in systems utilizing high intensity lamps.

Some designs attempt to account for the heat by permanently placing the lamp within the reflector. The use of a high temperature adhesive holds the lamp relative to the reflector. Flexible electrodes from the lamp are then placed through two holes in the reflector and are soldered to a metal connection. However, the two holes in the reflector allow light to escape, thereby degrading the image. The other end of the metal connection allows wires to be attached from an electrical source. When the lamp has surpassed its useful life, the costly reflector and lamp assembly, which can be referred to as the light generation assembly, is simply replaced and the old assembly is discarded.

SUMMARY

An integral reflector and heat sink for use in a projector assembly includes a reflector portion, which further acts as a heat sink and a lamp receiving opening defined in the reflector portion.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

An integral reflector and heat sink for use in a projector assembly includes a reflector portion, which further acts as a heat sink and a lamp receiving opening defined in the reflector portion.

In the following description, for purposes of explanation, numerous specific details are set forth in order to provide a thorough understanding of the present method and apparatus. It will be apparent, however, to one skilled in the art that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
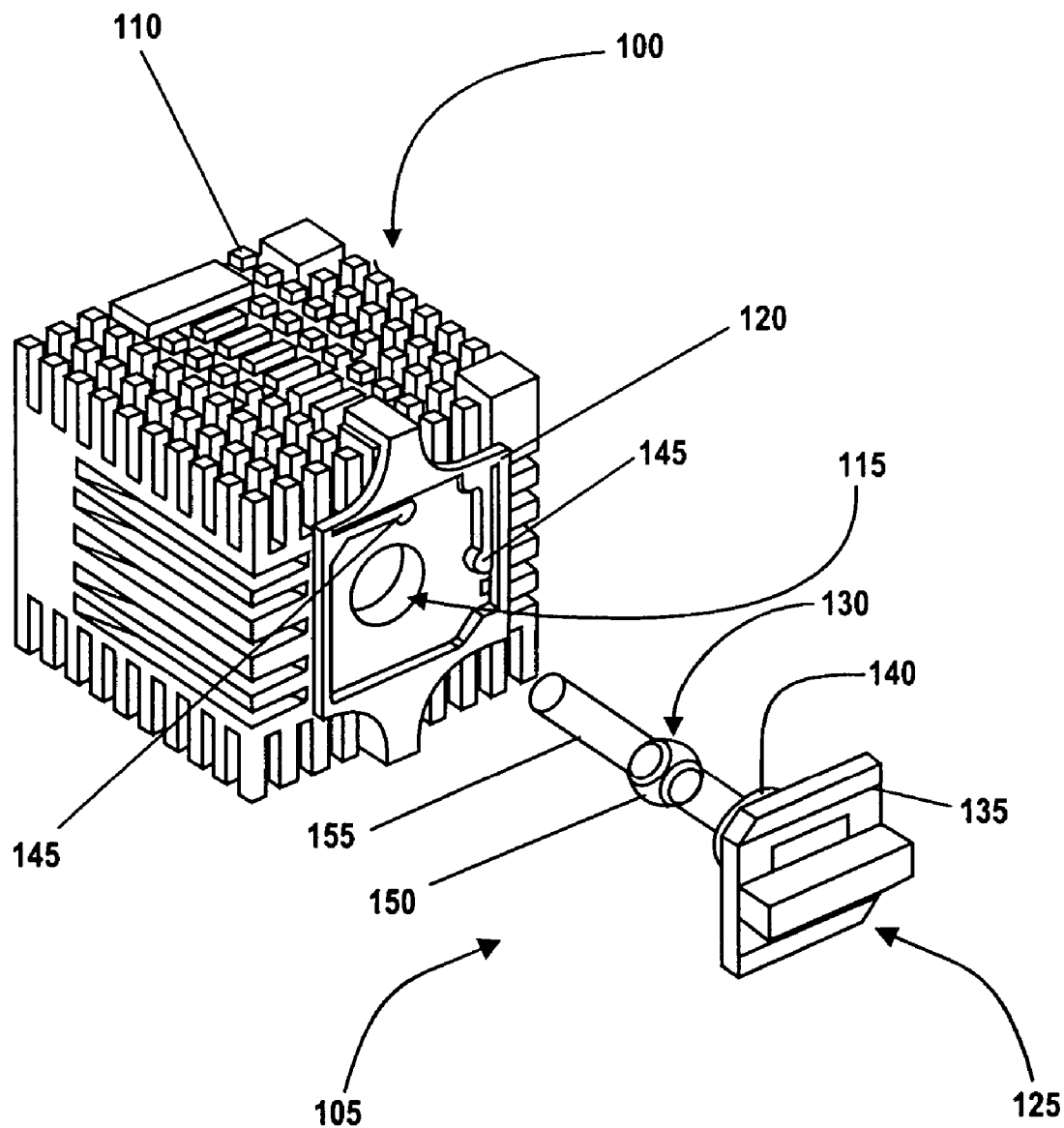
FIG. 1 illustrates a perspective view of an integral reflector and heat sink and a lamp assembly configured to be coupled thereto according to one exemplary embodiment.

FIG. 1 illustrates an integral reflector and heat sink, referred to herein as the "integrated unit" (100). The integrated unit (100) is configured to have a lamp assembly (105) removably coupled thereto. The heat sink of the integrated unit (100) includes a plurality of cooling fins (110) disposed around the perimeter of the unit (100). The integrated unit (100) may comprise a metallic material, such as aluminum or zinc or some combination of the two. The cooling fins (110) enhance the ability of the metallic integral reflector and heat sink (100) to remove heat produced by the lamp assembly (105).

Coupling of the lamp assembly (105) to the integral reflector and heat sink (100) is facilitated by a lamp receiving opening (115) defined in the integral reflector and heat sink (100), around which is located a lamp engaging assembly (120). The lamp assembly (105) includes a header (125) and a lamp (130). The header (125) includes circuitry that begins with source connections (not shown) on a base (135) of the lamp assembly (105) that are coupled to corresponding lamp connections (not shown) on an annular protrusion (140) by way of electrical interconnects disposed within the header (125).

The lamp assembly (105) is coupled to the integral reflector and heat sink (100) by placing the lamp (130) into the lamp receiving opening (115) until the base (135) of the header (125) comes into contact with the lamp engaging assembly (120). The lamp engaging assembly (120) includes engaging tabs (145) that secure the base (135) of the header (125) to the integral reflector and heat sink (105). The coupling of the lamp engaging assembly (120) to the integral reflector and heat sink (100) is precisely controlled to insure proper operating alignment of the lamp assembly (105) with respect to the integral reflector and heat sink (100)

The lamp (130) includes a fireball generator (150) within a tube (155). The lamp (130) also includes power connections coupled to the lamp connections. The fireball generator (150) creates a fireball, or a plasma, in response to an electrical current. This fireball creates the concentrated light for the projection system. The electrical current is supplied to the fireball generator (150) when the lamp's power connections are electrically coupled to lamp connections on the annular protrusion (140). The lamp connections are in turn electrically coupled source connections on the base (135), which are in turn coupled to a power source. The lamp (130) is placed within a cavity formed by the annular protrusion (140). Heat-resistant adhesive may be applied to the lamp/header interface to secure the lamp (130) to the header (125).

Exemplary Implementation and Operation

Figure 2A:
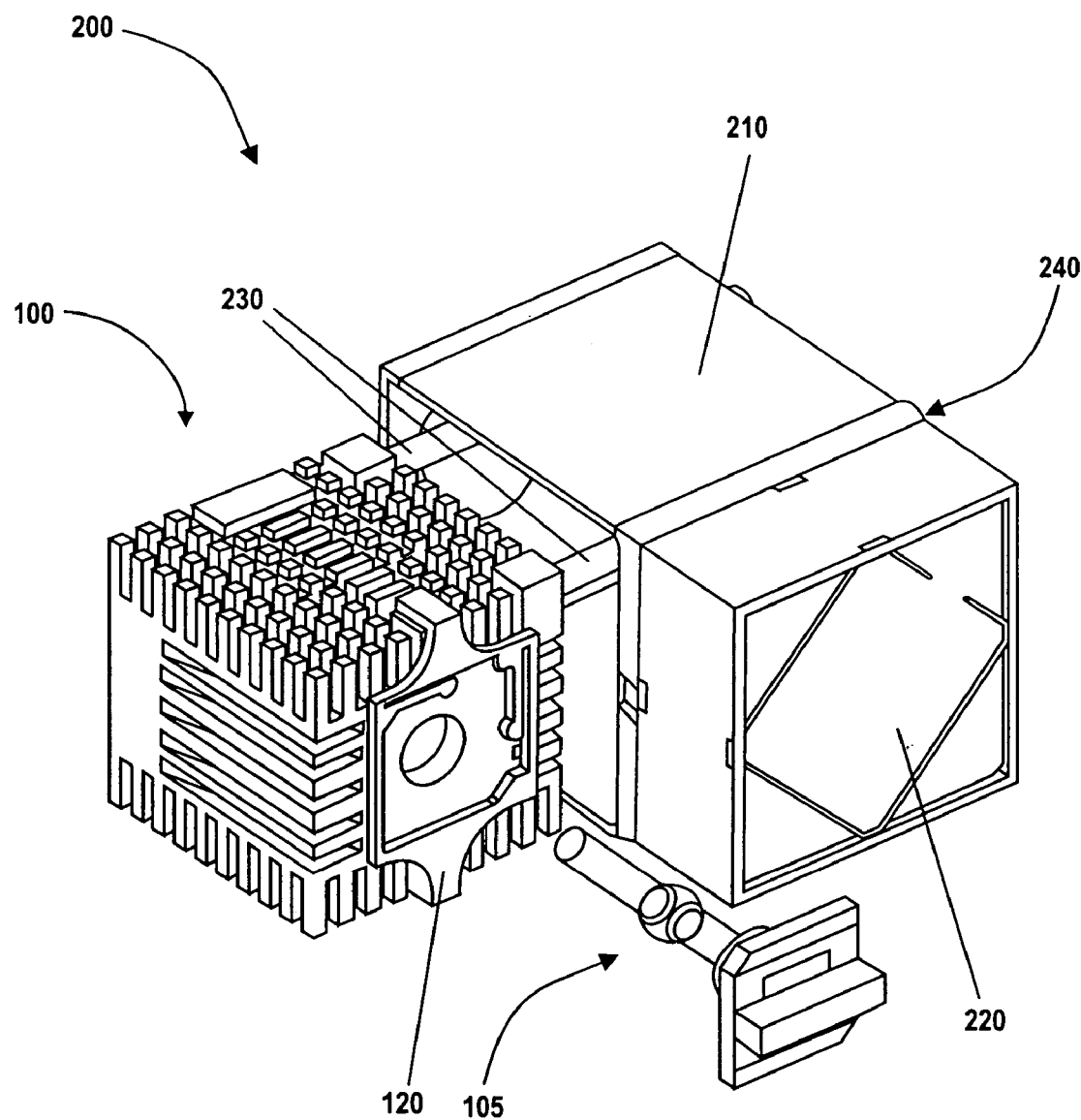
FIG. 2A illustrates an exploded perspective view of a light generation assembly according to one exemplary embodiment.

FIG. 2A illustrates a light generation assembly (200) that includes an integrated unit (100) similar to that shown in FIG. 1, a lamp assembly (105) also similar to that shown in FIG. 1, a housing (210) and a fan assembly (220). The integrated unit (100) includes a pair of guide rods (230). The housing (210) has channels or holes (240) defined therein corresponding to the guide rods (230). In addition, the housing (210) defines an enclosure to accommodate placement of the integrated unit (100) therein. As a result, the integrated unit (100) may be selectively placed within the housing (210) and withdrawn from the housing (210) due to the interaction of the guide rods (230), which slide with respect to the corresponding guide holes (not shown) in the housing (210). Movement of the integrated unit (100) in and out of the housing (210) place the integrated unit (100) inline or offline with respect to the fan assembly (220) and also place the light generation assembly (200) in an operating configuration and a lamp replacement configuration respectively as will be discussed in more detail below.

Figure 2B:
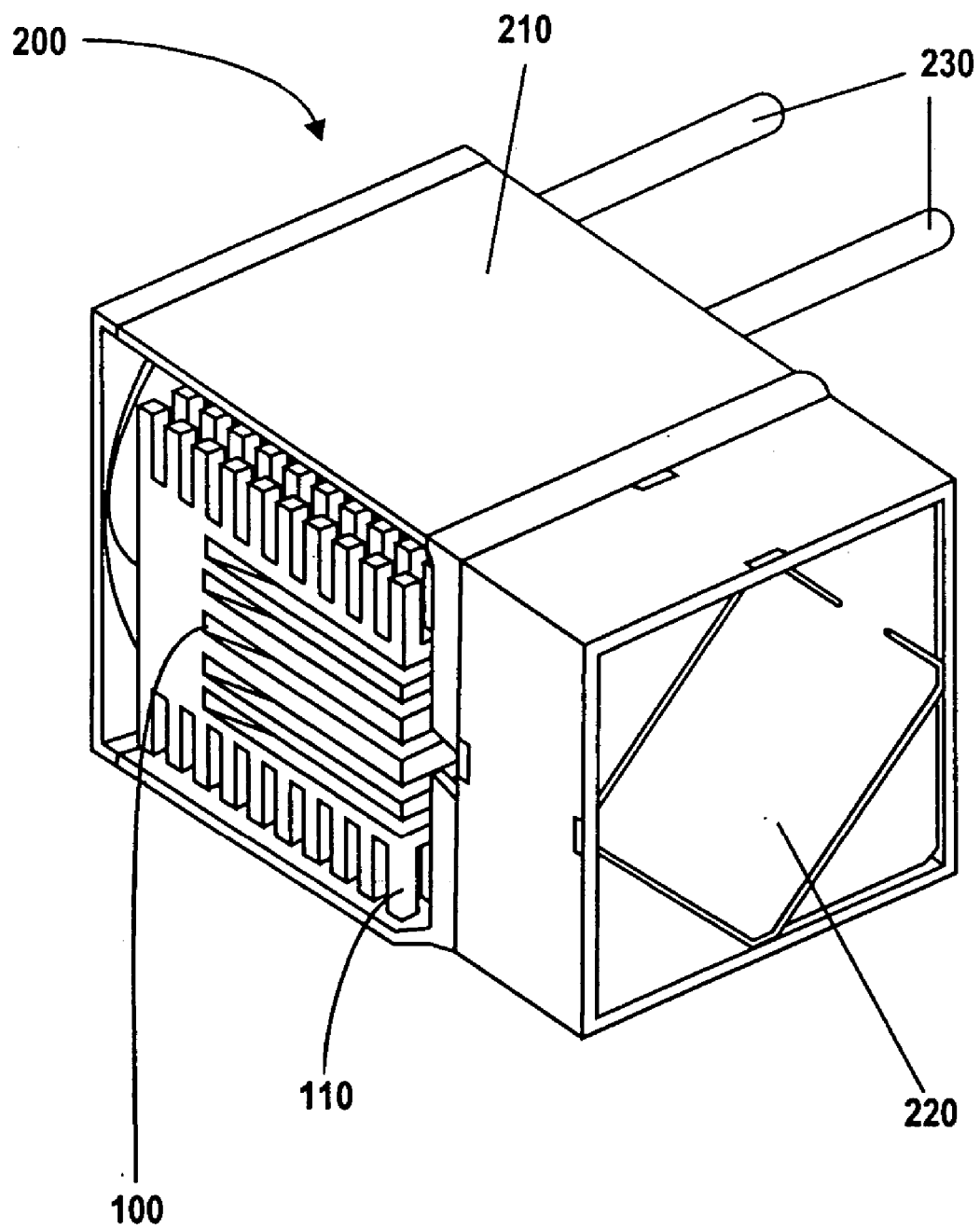
FIG. 2B illustrates a perspective view of the light generation assembly according to FIG. 2A in an operating configuration.

FIG. 2B illustrates the light generation assembly (200) in an operating configuration. As illustrated, in the operating configuration the integrated unit (100) is placed within the housing (210) whereby the fan assembly (220) is near the integrated unit (100) to cool it. As a result, the integrated unit (100) is placed in the flow path of the fan assembly (220). The flowing air convectively cools the integrated unit (100) as it flows past. This cooling is further enhanced by cooling fins (110). This convective cooling is enhanced by the metallic material of the integrated unit (100), which causes the integrated unit (100) to act as a heat sink. The improved cooling of the light generation assembly (200) facilitates improved projector system design. For example, the integrated unit (100) may be smaller because of the increased cooling efficiency. A smaller integrated unit (100) facilitates a reduction in the overall thickness of a projector of which the integrated unit (100) is a part. Alternatively, a higher wattage lamp (130; FIG. 1A) may be used with an integrated unit (100) of a given size. Further, a larger integrated unit (100) could be used with a given lamp (130; FIG. 1A) to increase the useful life of the lamp assembly (100). Consequently, the integrated unit (100) provides for increased design freedom, reduced operating costs, and increased ease of use of projector systems.

Figure 2C:
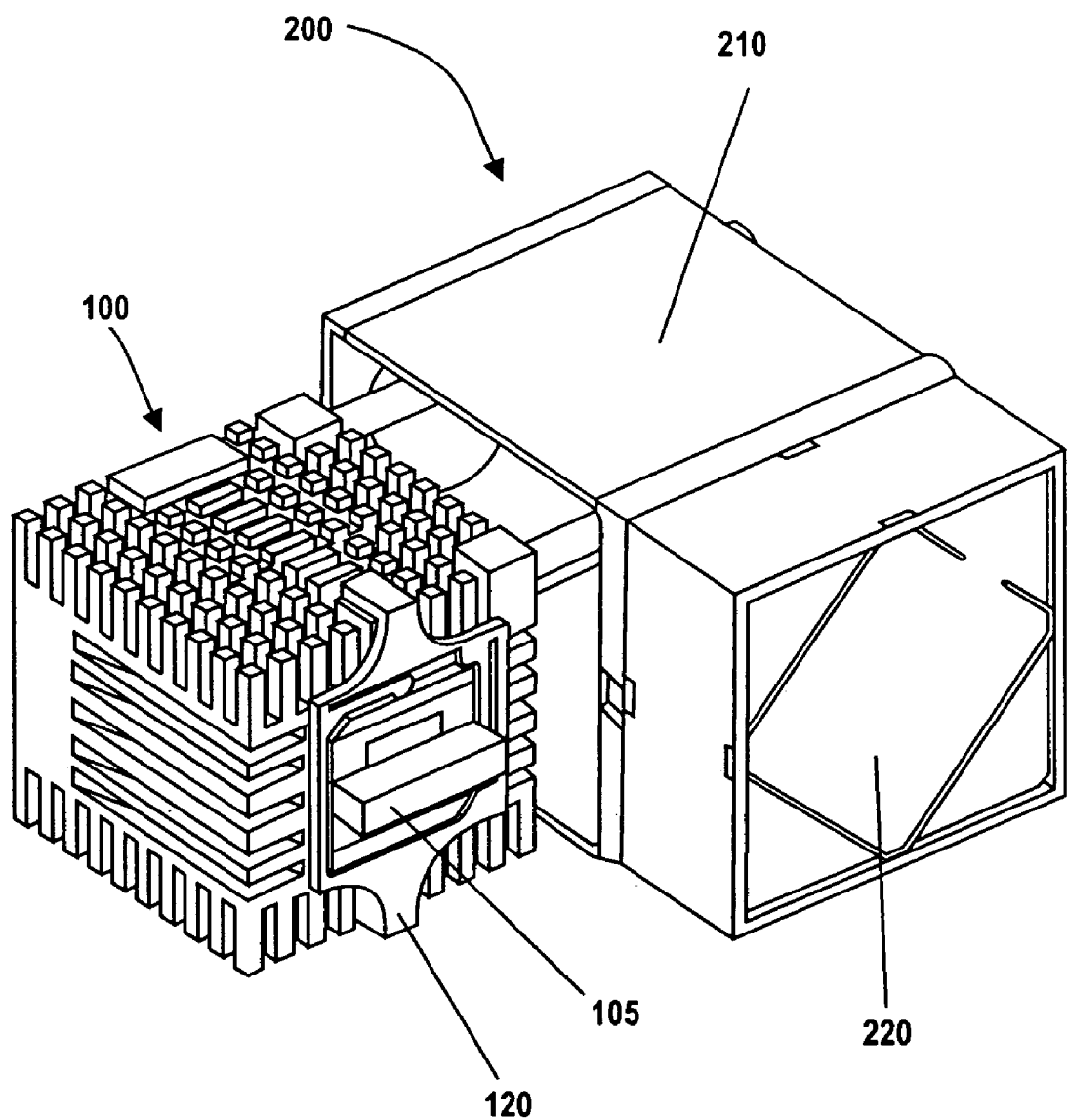
FIG. 2C illustrates a perspective view of the light generation assembly according to FIG. 2A in a lamp replacement configuration.

FIG. 2C illustrates the lamp assembly (105) coupled to the integrated unit (100). The light generation assembly (200) is shown in the lamp replacement configuration. Accordingly, the lamp assembly (105) is easily accessible. The header engagement assembly (120) is configured to insure proper alignment of the lamp assembly (105) with respect to the integrated unit (100) when the lamp assembly (105) is coupled to the integrated unit (100). Correct alignment of the lamp assembly (105) with respect to each part of the system facilitates optimal operation. Misalignment of the focal point causes degradation of the image since less light is captured and creates 'hot spots' on the screen instead of a uniform brightness.

Figure 3:
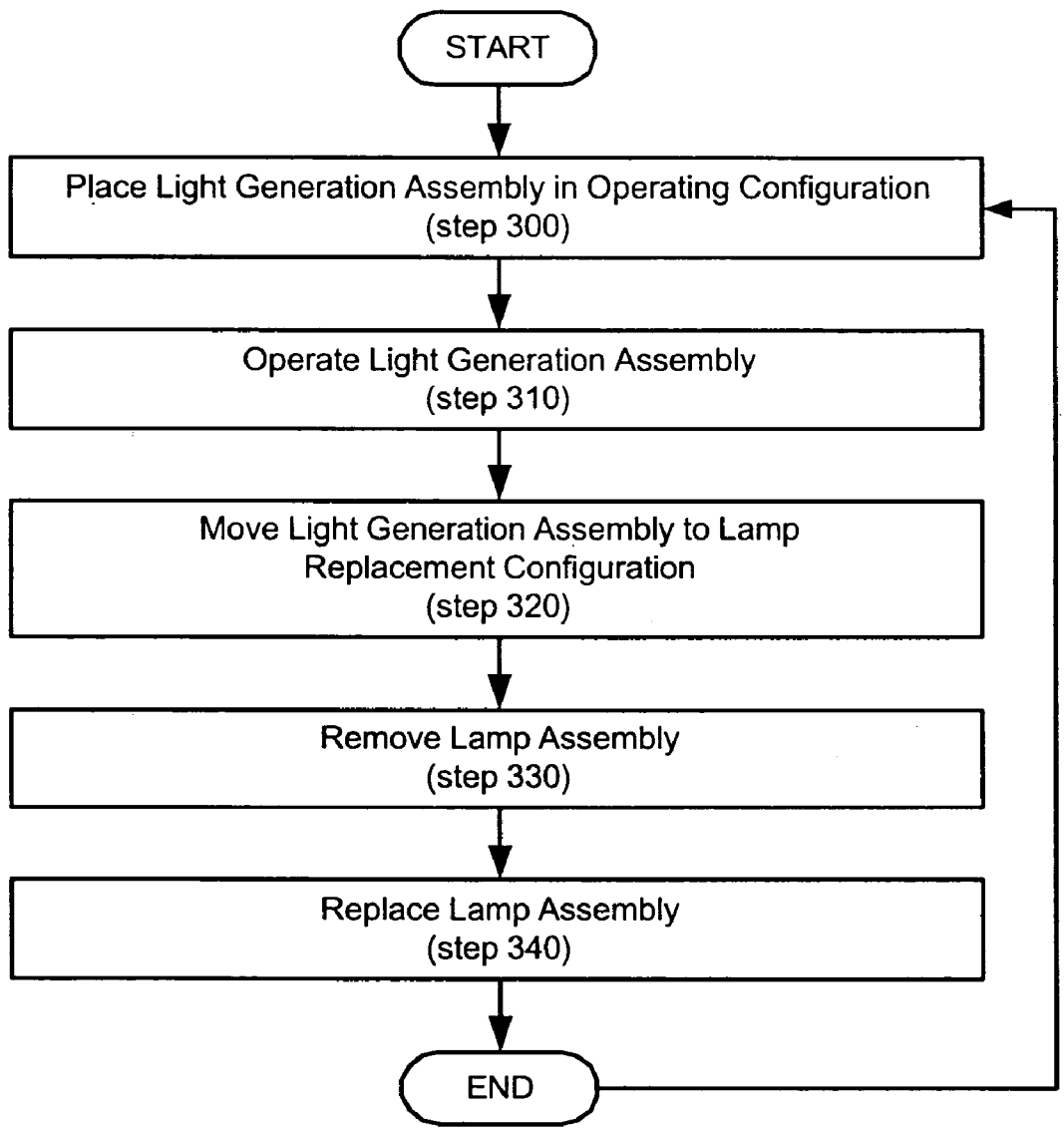
FIG. 3 is a flowchart illustrating a method of using a projector system having a light generation assembly according to one exemplary embodiment.

FIG. 3 is a flowchart illustrating a method of using a projector system having a light generation assembly with an integrated unit and a replaceable lamp assembly. The method begins by placing a light generation assembly in an operating configuration (step 300). The light generation assembly includes a housing, an integrated unit, a lamp assembly and a fan assembly. The integrated unit is configured to receive the lamp assembly. In addition, the integrated unit serves as a heat sink in order to enhance cooling of the light generation assembly. To further enhance this cooling, the integrated unit may include cooling fins. The lamp assembly causes air to flow past and/or over the integrated unit, to facilitate convection cooling.

When the light generation assembly is in the operating configuration, the fan is placed near the integrated unit to provide a cooling air flow. When the fan is near or adjacent the integrated unit, the projector system is operated (step 310) such that the light generation assembly is cooled by the fan assembly. In operation, the integrated unit remains in close proximity with the fan assembly. This configuration allows for the efficient cooling of the integrated unit, as the fan assembly directs air flow past and/or over the integrated unit. In order to remove the lamp assembly (step 330, below), the light generation assembly is placed in a lamp replacement configuration (step 320). One manner of placing the lamp in the lamp replacement configuration includes sliding the integrated unit away from the frame to which the fan assembly is coupled as shown in FIGS. 2A–2C. Further, a light generation assembly may be placed in a lamp replacement configuration according to the exemplary embodiments discussed below with reference to FIGS. 6A–6B and 7A–7B.

At some point, it will become necessary to remove the lamp assembly. At this point, the present method includes removing the lamp assembly (step 330). Once the lamp assembly has been removed, it is replaced (step 340). The integrated unit is then placed in an operating configuration (step 300). Once the operation configuration of the fan assembly has been restored, the projector system can be operated normally. As a result, the configuration of the light generation assembly facilitates access to a replaceable lamp assembly that is coupled to an integrated unit that acts as a heat sink.

The heat sink in turn allows for the improved cooling of the lamp assembly. Furthermore, the configuration of the integrated unit facilitates the removable coupling of a lamp assembly to an integrated unit without the use of tools. As a result, when the lamp has surpassed its useful life, the lamp assembly may alone be replaced without requiring the replacement of the integrated unit as well. In addition, the configuration of the integrated unit facilitates the coupling of a lamp assembly without requiring electrical routing to pass through additional holes. This configuration improves the effective light output of the lamp. Effective light output is the amount of light produced by the lamp that actually reaches the projection assembly of a projector system.

Figure 4:
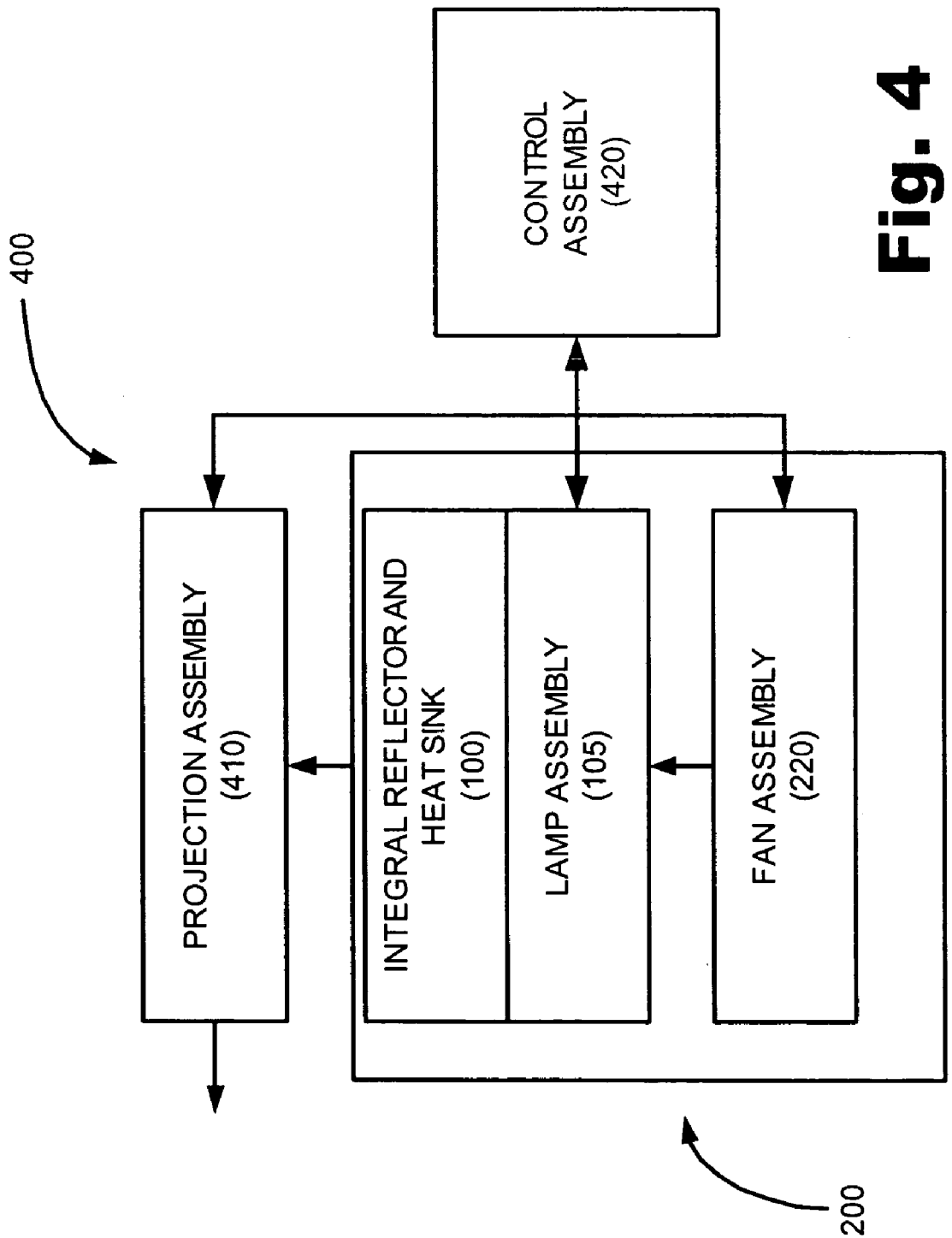
FIG. 4 is a schematic diagram of a projector system according to one exemplary embodiment.

FIG. 4 is a schematic representation of a projector system (400) that generally includes a light generation assembly (200) and a projection assembly (410) each coupled to a control assembly (420). The control assembly (420) controls the actuation of the lamp assembly (105), thereby controlling the generation of light by the light generation assembly (200). Similarly, the control assembly controls the projection assembly (410), which may be a spatial light modulator (SLM) such as a liquid crystal display (LCD) or a digital mirror device (DMD) type projection assembly. Light from the light generation assembly (200) is directed to the projection assembly (410) where it is manipulated to form an image that is then projected onto a viewing surface. Heat generated by the lamp assembly (105) is drawn into the integrated unit (100), which is then cooled by air from the fan assembly (220). During operation, the fan assembly (220) is near the integrated unit (100), which are both coupled to the housing (200).

Figure 5:
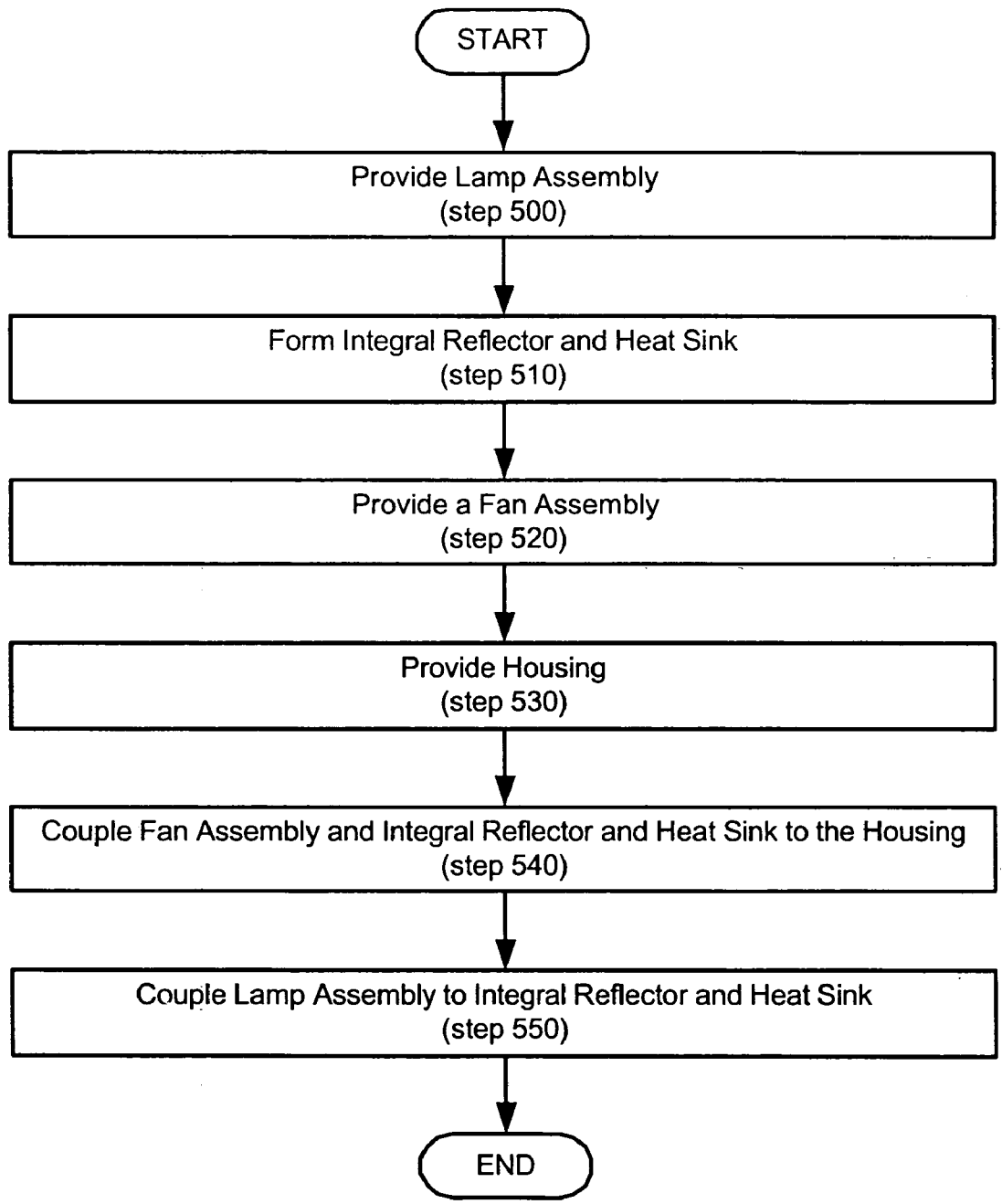
FIG. 5 is a flowchart illustrating a method of forming a light generation assembly according to one exemplary embodiment.

FIG. 5 is a flowchart illustrating a method of forming a projector system having a light generation assembly. The method begins by providing a lamp assembly (step 500). The lamp assembly includes a lamp header to which is coupled a lamp. The header may be configured to insure the optimal positioning of a fireball produced by the lamp as discussed above.

The present method further includes the formation of an integrated unit (step 510). As discussed, in addition to directing light from the light generation assembly to the projection assembly, the integrated unit acts as a heat sink. To enhance the removal of heat generated by the lamp assembly, the reflector may include cooling fins. Accordingly, formation of the integrated unit may also include the formation of cooling fins.

Heat removed from the lamp to the integrated unit is removed from the light generation system by way of a fan assembly. Therefore, the present method further includes providing a fan assembly (step 520) and a housing (step 530) to which the fan assembly and the integrated unit are coupled (step 540). The particular order of providing the individual assemblies and the housing is for illustration only, and can be carried out in any order.

The coupling of the integrated unit and fan assembly to the housing (step 540) allows for displacement between the fan assembly and the integrated unit. Access to the lamp assembly makes coupling the lamp assembly to the integrated unit (step 550) easier as well as subsequent replacement of the lamp assembly.

Accordingly, the present method provides for the formation of a light generation system in which a lamp assembly may be conveniently replaced without the use of tools. Replacement of only the lamp assembly may reduce the costs of operating projector systems. Further, the integrated unit that also serves as a sink allows for the improved cooling of the lamp assembly. The improved cooling of the lamp assembly facilitates improved projector system design, as previously discussed.

ALTERNATIVE EMBODIMENTS

Figure 6A:
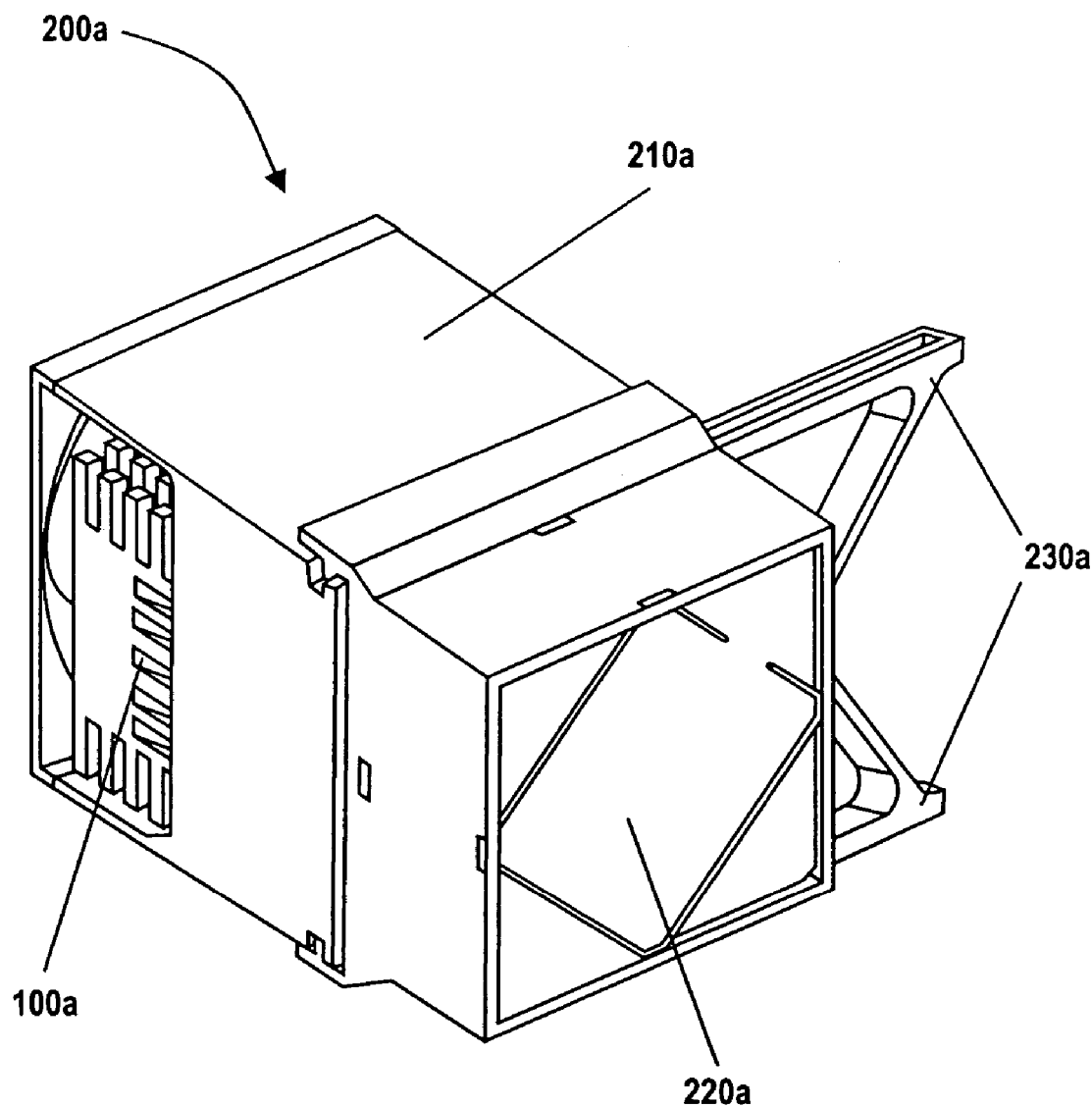
FIG. 6A illustrates a perspective view of a light generation assembly shown in an operating configuration according to one exemplary embodiment.
Figure 6B:
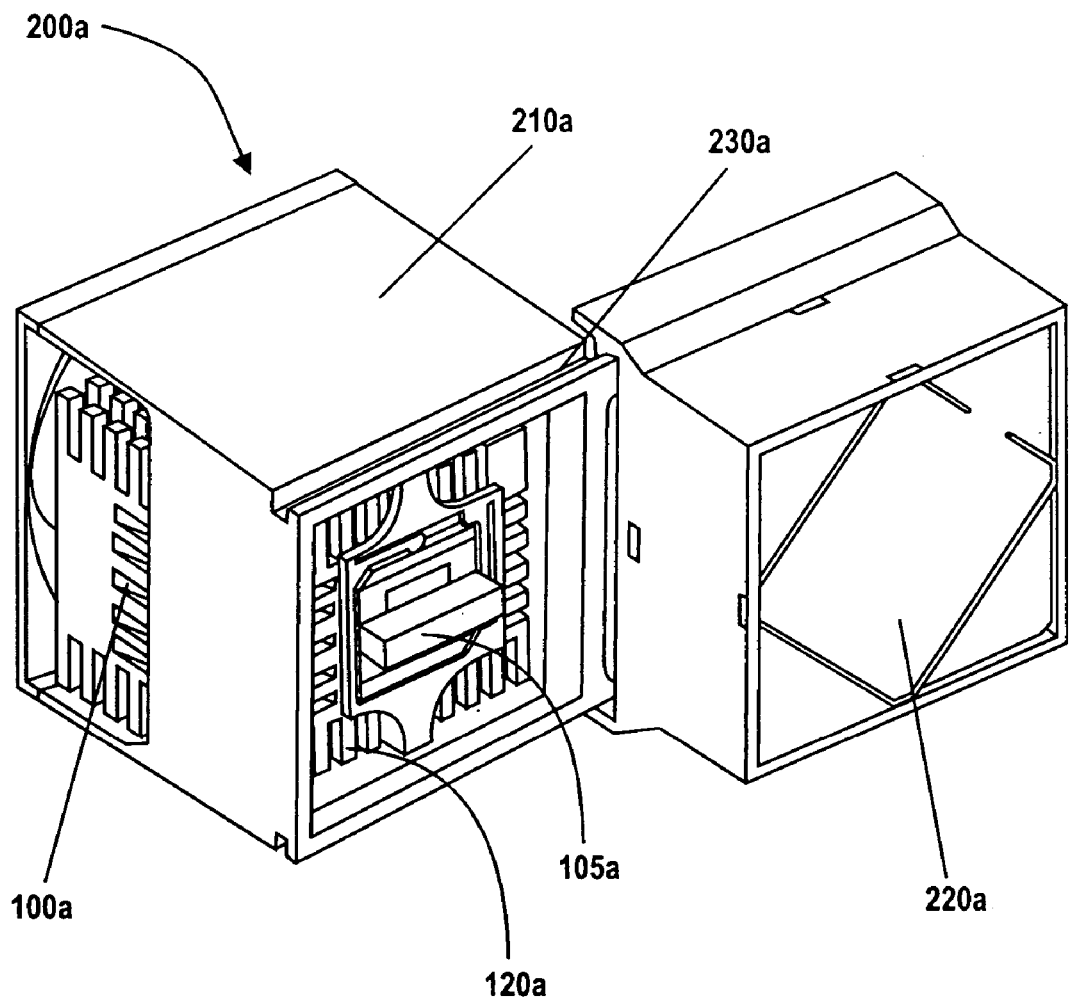
FIG. 6B illustrates a perspective view of a light generation assembly shown in a lamp replacement configuration according to one exemplary embodiment.

FIGS. 6A–6B illustrate a light generation assembly (200a), which includes an integrated unit (100a) similar to that shown in FIG. 1, a lamp assembly (105a), a housing (210a) and a fan assembly (220a). The light generation assembly (200a) further includes a pair of guide rails (230a) coupled to the housing (210a) between the integrated unit (100a) and the fan assembly (220a). The fan assembly (220a) slides along the guide rails (230a) to provide access to the lamp assembly (105a). This access is achieved by sliding the fan assembly (220a) along the guide rails (230a) away from the integrated unit (100a). Accordingly, the fan assembly (220a) is moved normal to a horizontal central axis common to the housing (210a), the fan assembly (220a) and the integrated unit (100a). As a result, the light generation assembly (200a) may be readily moved from the operating configuration shown in FIG. 6A to the lamp replacement configuration shown in FIG. 6B.

Figure 7A:
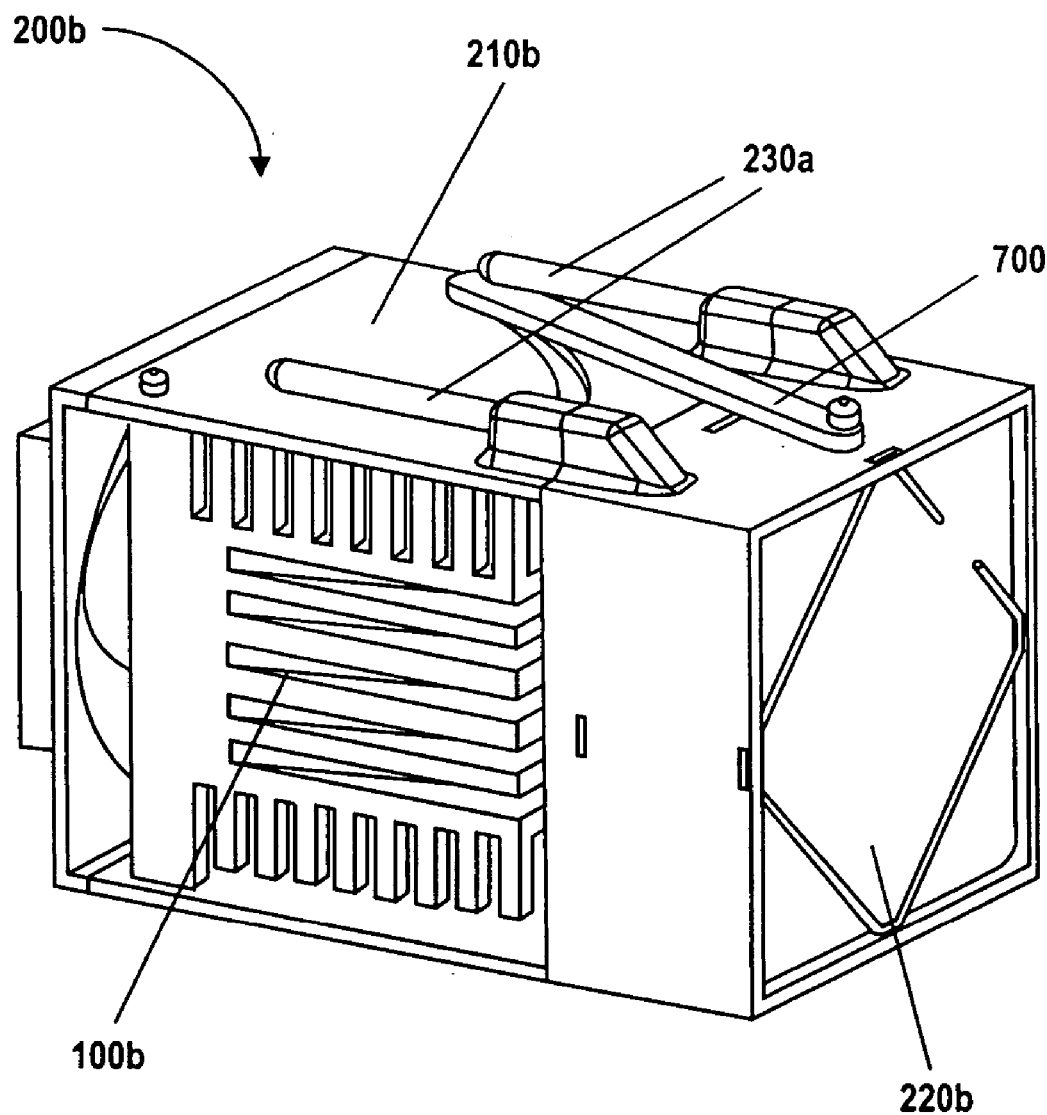
FIG. 7A illustrates a perspective view of a light generation assembly shown in an operating configuration according to one exemplary embodiment.
Figure 7B:
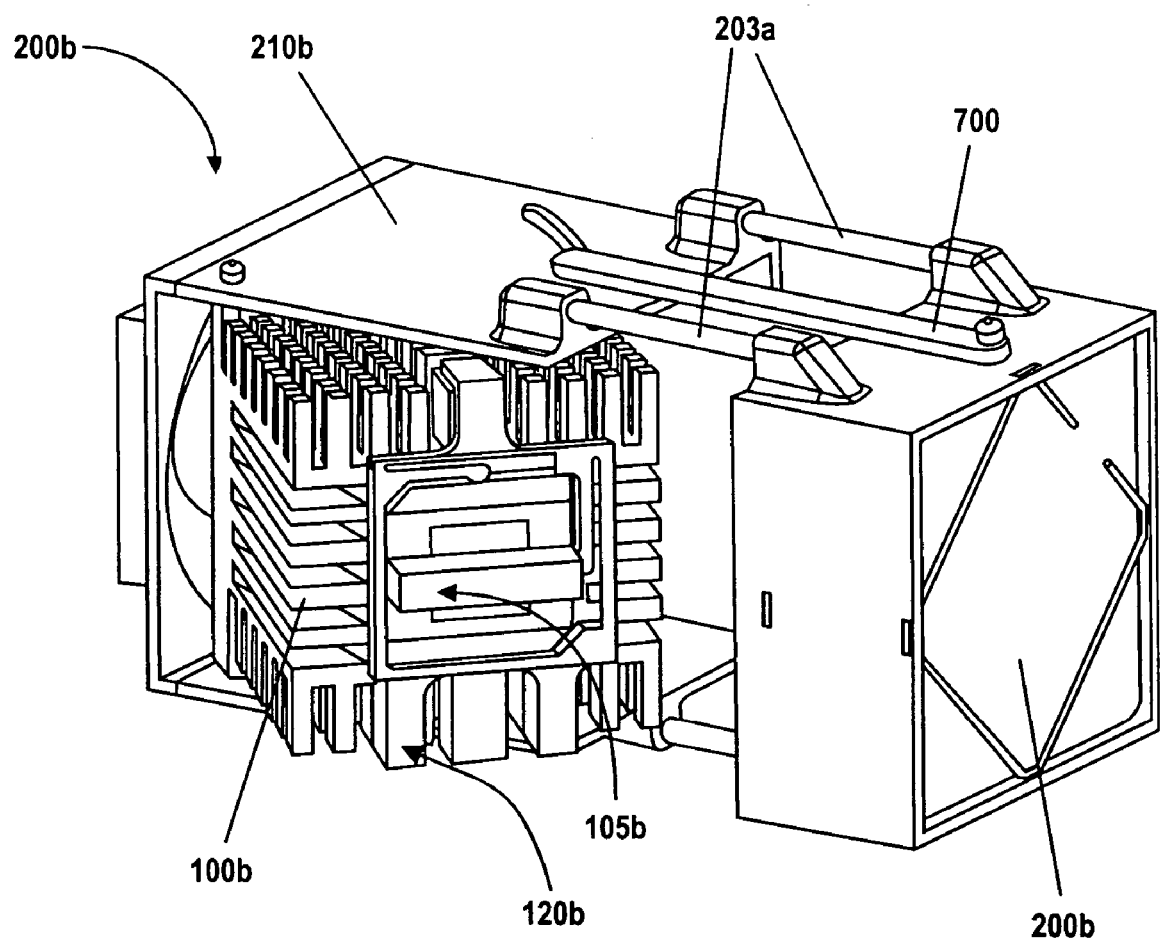
FIG. 7B illustrates a perspective view of a light generation assembly shown in a lamp replacement configuration according to one exemplary embodiment.

FIGS. 7A–7B illustrate a light generation assembly (200b) which includes an integrated unit (100b), a lamp assembly (105b), a housing (210b) and a fan assembly (220b). The light generation assembly (200b) further includes a pair of guide rails (230b) coupled to the housing (210b) and the fan assembly (220b). The fan assembly (220b) slides along the guide rods (230b) to provide access to the lamp assembly (105b). This access is achieved by sliding the fan assembly (220b) along the guide rails (230b) away from the integrated unit (100b). Further, a linkage member (700) is coupled to the fan assembly (220b) and the integrated unit (100b). As the fan assembly (220b) is moved with respect to the integrated unit (100b), the linkage member (700) travels along a slot (710) defined in the housing (210b), thereby causing the integrated unit (100b) to rotate. Accordingly, the fan assembly (220b) is moved along a horizontal central axis common to the housing (210b), the fan assembly (220b) and the integrated unit (100b). Consequently, the light generation assembly (200b) may be readily moved from the operating configuration shown in FIG. 7A to the lamp replacement configuration shown in FIG. 7B. As a result, the lamp assembly (105b) is readily accessible, and may be readily replaced as needed.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the disclosure be defined by the following claims.

What is claimed is:

1. A light generation assembly, comprising:
    an integrated unit including an integral reflector and heat sink, and a lamp receiving opening defined in said integral reflector and heat sink;
    a lamp assembly replaceably coupled to said integrated unit and extending at least partially through said lamp receiving opening, wherein a base of said lamp assembly is attached to said integrated unit with tabs on said integrated unit;
    a housing configured to contain said integrated unit and lamp assembly and to facilitate movement of said light generation assembly between an operating configuration and a lamp replacement configuration; and
    a fan assembly coupled to said housing.

2. The assembly of claim 1, wherein said integral reflector and heat sink comprises a plurality of cooling fins.

3. The assembly of claim 1, wherein said integral reflector and heat sink comprises a metallic material.

4. The assembly of claim 3, wherein, said metallic material comprises zinc.

5. The assembly of claim 3, wherein said metallic material comprises aluminum.

6. The light generation assembly of claim 1, wherein said integrated unit is supported on guide rods and is moved laterally on said guide rods out of said housing to place said light generation assembly in said lamp replacement configuration.

7. The light generation assembly of claim 1, wherein said fan assembly moves laterally with respect to said housing to place the light generation assembly in said lamp replacement configuration.

8. The light generation assembly of claim 1, wherein said fan assembly moves away from said housing along an optical axis of said light generation assembly, said movement of said lamp assembly exposing said integrated unit and rotating said integrated unit with respect to said housing to place the light generation assembly in said lamp replacement configuration.

9. A light generation assembly, comprising:
an integrated unit including an integral reflector and heat sink, and a lamp receiving opening defined in said integral reflector and heat sink;
a lamp assembly replaceably coupled to said integrated unit and extending at least partially through said lamp receiving opening;
a housing configured to facilitate movement of said integrated unit between an operating configuration and a lamp replacement configuration; and
a fan assembly coupled to said housing, wherein a central axis is defined through said integrated unit said lamp assembly, said housing and said fan assembly, said fan assembly being aligned to blow along said central axis and said reflector of said integrated unit being aligned to direct light alone said central axis;
further comprising guide rods coupled to said housing and coupled to said integrated unit, wherein said lamp assembly and integrated unit slide on said guide rods laterally and substantially normal to said central axis to move said light generation assembly between said operating configuration and said lamp replacement configuration.

10. A light generation assembly, comprising:
an integrated unit including an integral reflector and heat sink, and a lamp receiving opening defined in said integral reflector and heat sink;
a lamp assembly replaceably coupled to said integrated unit and extending at least partially through said lamp receiving opening;
a housing configured to facilitate movement of said integrated unit between an operating configuration and a lamp replacement configuration; and
a fan assembly coupled to said housing;
further comprising guide rails coupled to said housing and said fan assembly for moving said fan assembly between an operating configuration in which said fan assembly is substantially inline with said integrated unit and a lamp replacement configuration in which said fan assembly is substantially offline with said integrated unit.

11. A light generation assembly, comprising:
an integrated unit including an integral reflector and heat sink, and a lamp receiving opening defined in said integral reflector and heat sink;
a lamp assembly replaceably coupled to said integrated unit and extending at least partially through said lamp receiving opening;
a housing configured to facilitate movement of said integrated unit between an operating configuration and a lamp replacement configuration; and
a fan assembly coupled to said housing; further comprising guide rails coupling said fan assembly and said housing, and a linkage member coupling said integrated unit and said fan assembly such that, when said fan assembly is moved along said guide rails away from said housing, said integrated unit is exposed and rotated by said linkage member with respect to said housing.

12. The light generation assembly of claim 11, further comprising a curved slot in said housing through which said linkage member is coupled to said integrated unit.

13. A method of using a light generation assembly, comprising:
placing said light generation assembly in an operating configuration in which a fan assembly coupled to a housing is placed near an integral reflector and heat sink contained in said housing;
selectively operating a lamp assembly which is replaceably coupled to said integral reflector and heat sink;
removing beat generated by said operating of said lamp assembly by flowing air over said integral reflector and heat sink with said fan assembly; and
when replacing said lamp assembly, sliding said fan assembly with respect to said housing to provide access to said lamp assembly.

14. The method of claim 13, further comprising sliding said fan assembly laterally with respect to said housing to provide access to said lamp assembly.

15. The method of claim 13, further comprising sliding said fan assembly away from said housing and causing said integral reflector and heat sink to rotate with respect to said housing to provide access to said lamp assembly.

16. A method of using a light generation assembly, comprising:
placing said light generation assembly in an operating configuration in which a fan assembly is placed near an integral reflector and heat sink;
selectively operating a lamp assembly which is replaceably coupled to said integral reflector and heat sink;
removing heat generated by said operating of said lamp assembly by flowing air over said integral reflector and beat sink with said fan assembly;
replacing said lamp assembly by moving said light generation assembly to a lamp replacement configuration to facilitate access to said lamp assembly, removing said lamp assembly from said integral reflector and heat sink, coupling a new lamp assembly to said integral reflector and heat sink, and moving said lamp generation assembly to an operating configuration;
wherein moving said light generation to a lamp replacement configuration comprises moving said fan assembly away from said integral reflector and beat sink and wherein said moving said light generation assembly to an operating configuration comprises moving said fan assembly toward said integral reflector and heat sink.

17. The method of claim 16, wherein said lamp assembly, integral reflector and heat sink, and said housing are located on a common axis and moving said fan assembly comprises moving said fan assembly substantially normally to said common axis.

18. The method of claim 16, wherein said lamp assembly, integral reflector and heat sink, and said housing are located on a common axis and moving said fan assembly comprises moving said fan assembly along said common axis.

19. The method of claim 18, further comprising causing said integral reflector and heat sink to rotate with respect to said housing in response to moving said fan assembly.

20. A method of forming a light generation assembly, comprising:
- forming an integral reflector and heat sink having a reflecting portion and a lamp receiving opening defined therein;
- coupling said integral reflector and heat sink to a housing;
- coupling a fan assembly to said housing;
- replaceably coupling a lamp assembly to said integral reflector and heat sink extending at least partially through said lamp receiving opening; and
- defining central axis through said reflector, said lamp assembly, said housing and said fan assembly, said fan assembly being aligned to blow along said central axis and said reflector being aligned to direct light along said central axis;
- wherein coupling said integral reflector and heat sink to said housing comprises forming guide holes in said housing and coupling guide rods to said integral reflector and heat sink and to said guide rods whereby said displacement of said guide rods with respect to said guide holes causes said integral reflector and heat sink to be moved laterally and substantially normal to said central axis from an operating configuration within said housing to a lamp replacement configuration at least initially outside of said housing.

21. A method of forming a light generation assembly, comprising:
- forming an integral reflector and heat sink having a reflecting portion and a lamp receiving opening defined therein;
- coupling said integral reflector and heat sink to a housing;
- coupling a fan assembly to said housing; and
- replaceably coupling a lamp assembly to said integral reflector and heat sink extending at least partially through said lamp receiving opening;
- wherein coupling said fan assembly to said housing comprises coupling guides to said housing wherein is located said integral reflector and heat sink and moveably coupling said fan assembly to said guide rails so as to facilitate movement of said fan assembly from an operating configuration near said integral reflector and heat sink to a lamp replacement configuration at a second location away from said integral reflector and heat sink.

22. The method of claim 21, further comprising locating said lamp assembly, integral reflector and heat sink, and said housing on a common axis so as to facilitate movement of said fan assembly substantially normal to said common axis between said operating configuration and said lamp replacement configuration.

23. The method of claim 21, further comprising locating said lamp assembly, integral reflector and heat sink, and said housing on a common axis so as to facilitate movement of said fan assembly wherein said fan assembly is moved along said common axis between said operating configuration and said lamp replacement configuration.

24. The method of claim 23, farther comprising coupling a linkage member to said fan assembly and said integral reflector and heat sink through a slot in said housing whereby said integral reflector and heat sink rotated wit respect to said housing in response to movement of said linkage member due to movement of said fan assembly.

25. The method of claim 21, further comprising forming cooling fins on said integral reflector and heat sink.

* * * * *

UNITED STATES PATENT AND TRADEMARK OFFICE
CERTIFICATE OF CORRECTION

PATENT NO. : 7,021,767 B2
APPLICATION NO. : 10/769355
DATED : April 4, 2006
INVENTOR(S) : Koegler et al.

Page 1 of 1

It is certified that error appears in the above-identified patent and that said Letters Patent is hereby corrected as shown below:

In the Claims

Col. 8 (line 20), delete "beat" and insert therefor --heat--.

Col. 8 (line 42), delete "beat" and insert therefor --heat--.

Col. 8 (line 52), delete "beat" and insert therefor --heat--.

Col. 9 (line 25), delete "initially" and insert therefor --partially--.

Col. 10 (line 28), delete "wit" and insert therefor --with--.

Signed and Sealed this

Sixth Day of March, 2007

JON W. DUDAS
*Director of the United States Patent and Trademark Office*